March 27, 1951 G. H. WOOD ET AL 2,546,808
PRESSURE DISPENSING DEVICE
Filed March 22, 1947 2 Sheets-Sheet 1
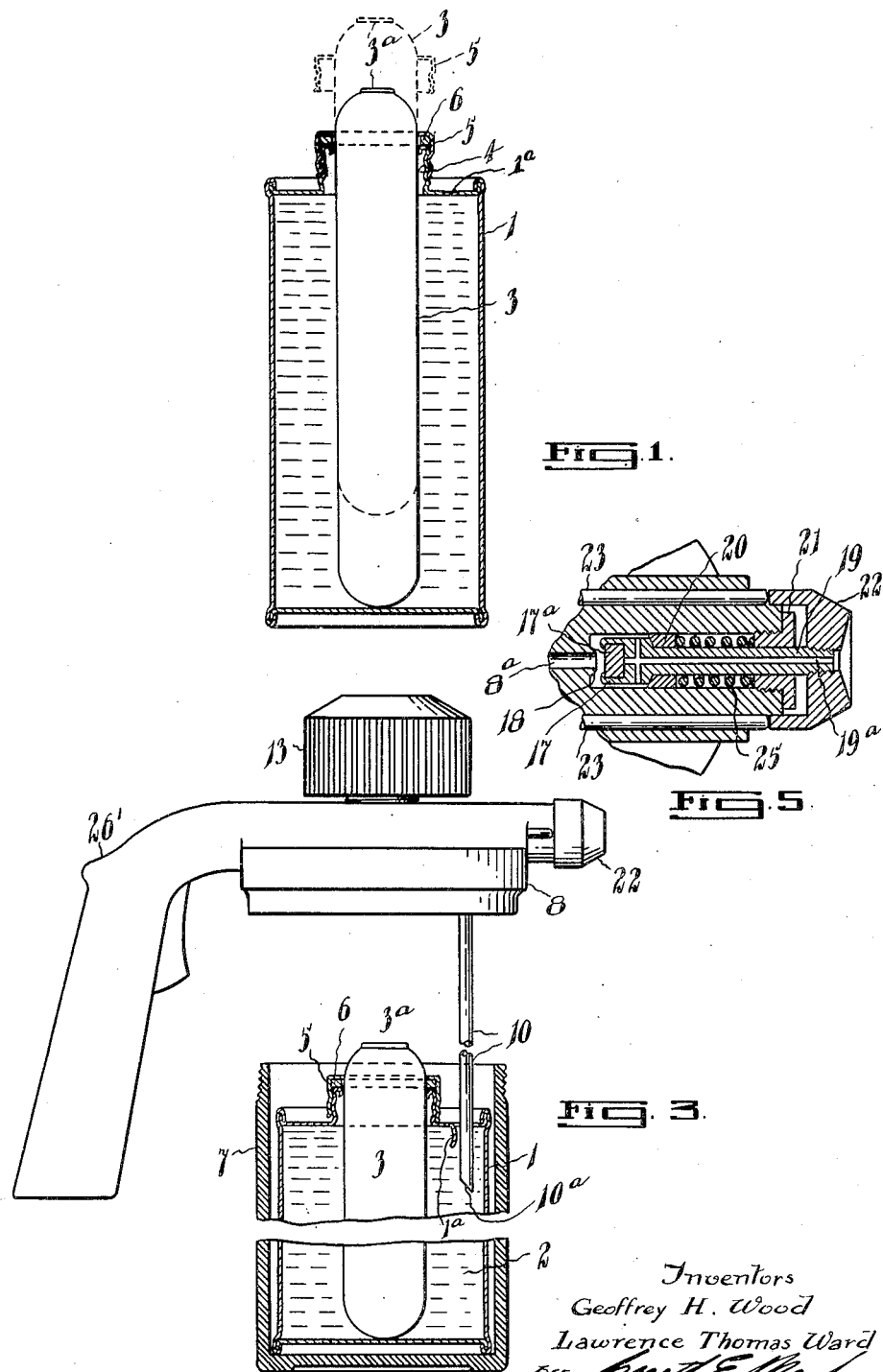
Inventors
Geoffrey H. Wood
Lawrence Thomas Ward
ATTY March 27, 1951    G. H. WOOD ET AL    2,546,808
PRESSURE DISPENSING DEVICE Filed March 22, 1947    2 Sheets-Sheet 2

Inventors
Geoffrey H. Wood
Lawrence Thomas Ward
by [signature]
ATTY.

Patented Mar. 27, 1951

2,546,808

UNITED STATES PATENT OFFICE 2,546,808

PRESSURE DISPENSING DEVICE

Geoffrey H. Wood, Toronto, Ontario, Canada, and Lawrence Thomas Ward, East Orange, N. J., assignors to Prel Incorporated, East Orange, N. J., a corporation Application March 22, 1947, Serial No. 736,538

8 Claims. (Cl. 222—399)

This invention relates to pressure dispensing devices, particularly to devices of the kind which are used to spray insecticides, germicides, bactericides, medicants, fumigants, deodorants, lubricants, paints, lacquers, and other chemicals, liquid gases, and suspensions of finely divided solids.

The object of the invention is to provide a dispensing device which is re-usable and a container for repellant gas and a material to be dispensed which is sufficiently cheap to make that it can be disposed of after the material is exhausted.

Generally speaking, the object of the invention is attained by providing a complete package composed of a container holding the material to be dispensed and incorporated within such container a cylinder of gas under pressure, and a sprayer unit into which the container is placed. Incorporated in this sprayer unit is the necessary mechanism for releasing the gas pressure and convenient means for dispensing and atomizing the material within the container.

The feature of the invention is that the material container may be made of light weight material such as ordinary tin plate, commonly used for containing materials to be shipped, which is cheap and easy to make and not adapted to withstand heavy pressure. When this container is placed within the casing of the sprayer unit, which is of sufficiently strong construction to withstand the gas pressure, the pressure is equalized on all sides of the material container when applied thereto because it extends not only within the material container but between the outer sides of the material container and the inner side of the casing of the sprayer unit. Another advantage of the construction is that it is possible to use the dispensing unit for all kinds of materials, since the materials do not come in contact with the outer casing of the sprayer unit when dispensed, so that it is necessary only to make the material container of such material as will not be affected by the material which it contains, or to coat the interior of the material container with a protective substance, and to make the dispensing tube and passageway of material which is not subject to attack by such material. Thus the device may be used for dispensing highly corrosive substances such as ammonium compounds.

A further advantage obtained by the invention is that the dispensing of the material may be regulated, that is to say that once the gas cylinder is punctured it is not necessary that the whole of the material be dispensed at once, but the dispensing can be controlled so that the material can be discharged at such rate and in such quantities and at such time as may be desired.

The invention is hereinafter more particularly described and is illustrated by way of example in the accompanying drawings in which:

Figure 1 is a vertical cross section of the disposable material container with the propellant gas cylinder mounted therein;

Figure 3 is a vertical section of the sprayer unit as a whole; with the cover or head in side elevation; and shown partially removed from the main body or case of the sprayer unit;

Figure 5 is a fragmentary horizontal section on the line 5—5 in Fig. 2.

In the drawings corresponding numerals in the different figures refer to corresponding parts.

Figure 4:
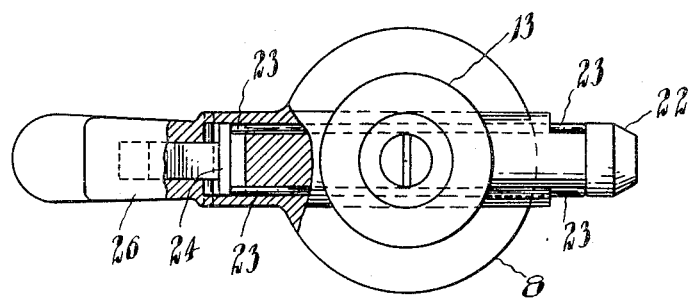
Figure 4 is a top plan view of the sprayer unit partly in section.

The inner material container 1 is preferably cylindrical in shape and constructed of tin plate in accordance with the ordinary tin can manufacturing methods and is shown as being partly full of a liquid 2 which is the material to be dispensed. In the top of the material container 1 is provided a weakened area 1ª where the material is considerably reduced by forming so that it may be readily punctured by a discharge tube as hereinafter described.

The propellant gas cylinder 3 may be of ordinary construction such as is used in other dispensing devices provided with the usual milled puncturable area 3ª in the upper end thereof.

An opening is provided in the top of the material container 1 provided with a threaded neck 4. The gas propellant cylinder 3 extends through the opening into the material container 1 with its upper end containing the puncturable area 3ª located outside of the container. A flange or collar 5 extends around the propellant gas cylinder 3 adjacent its upper end and is threaded so that it may be screwed over the threaded neck 4. A washer 6 preferably of compressible plastic or similar material engages the upper end of the neck 4 to form a gas-tight closure. The material container 1 will not be of sufficient strong construction to withstand the pressure of the gas contained in the cylinder 3, if such gas were discharged into the container at a time when the pressure surrounding the container was atmospheric.

Figure 2:
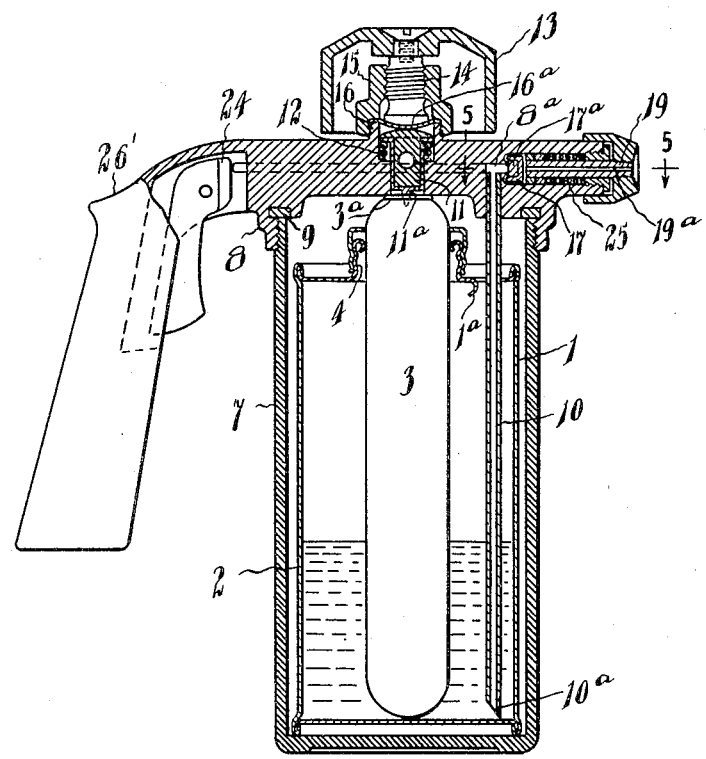
Figure 2 is a vertical cross section through the sprayer unit as a whole.

Referring now to Figures 2 and 3 it will be seen that the material container 1 is adapted to fit in the outer casing 7 of the spraying unit, with a space between the outer surface of the container 1 and the inner surface of the casing 7. The casing is of strong construction fully capable of withstanding the pressure of the gas within the cylinder 3 when released. The casing 7 is provided with a top, head or cover 8 which is screwed onto the upper end thereof. A gasket 9 provides a gas-tight joint. Formed in the cover 8 is a discharge passageway 8a which extends from the interior to the exterior of the casing and is provided with valve means hereinafter described.

Screwed into the head 8 and depending therefrom and communicating with the discharge passage 8a is discharge tube 10 having a bevelled or pointed lower end 10a adapted to pierce weakened area 1a of the material container 1 when the sprayer unit is assembled.

Slidably mounted in the central aperture in the cover 8 is a rod 11 having a piercing pin 11a depending from its lower end and adapted to pierce the gas propellant cylinder 3 through its puncturable area 3a.

A coiled spring 12 surrounds the pin 11 and engages a shoulder at the top of the pin, and a shoulder in the cover 8 and tends to push the pin outwardly and disengage it from the cylinder 3. In Fig. 2 the pin is shown piercing the cylinder 3.

To cause the pin to pierce the cylinder 3, a hand wheel 13 is provided exteriorly of the cover and secured to the hand wheel 13 is a threaded stem 14 which screws into a cap 15 which is screwed to a threaded flange 16 on the cover 8. Interposed between a shoulder on the cap 15 and the upper end of the flange 16 is a diaphragm 16a which forms a gas-tight seal between the interior of the sprayer unit and the exterior thereof. The stem 14 bears on the diaphragm 16a and applies pressure to the top of the rod 11, depressing it when the wheel 13 turns clockwise and permitting it to be pushed out by the spring 12 when it turns anti-clockwise.

In assembling the unit, the material container 1 containing the gas propellant cylinder 3 is placed within the casing 7. The cover 8 is then raised over the casing 1 and the bevelled lower piercing end of the discharge tube 2 is forced through the weakened puncturable area 1a of the material container 1 as illustrated in Fig. 3. The cover is then screwed on to the casing 7. The material container 1 is freely rotatable in the casing 7, and by virtue of the fact that the discharge tube 10 is inserted therein, will rotate with the cover as the cover is screwed down. The space between the discharge tube 10 and the broken edges of the material container 1 is sufficient to permit ingress of gas but normally not sufficient to permit the material within the container to flow out should the container not be in upright position.

When the cover is screwed on tightly, the hand wheel 13 may be turned clockwise to puncture the propellant gas cylinder 3 as illustrated in Fig. 3. This releases the gas in the cylinder which passes out into the casing 7, fills the space between the material container 1 and the casing 7 and enters the top of the material container 1, providing a pressure which will expel or discharge the material within said container through the discharge tube 10 which preferably extends substantially to the bottom of the container 1.

The pressure of the gas outside the material container 1 counteracts the pressure of the gas which passes into the container at point 1a, so that despite the fact that the container 1 is of light weight rupturable material, it does not break. The pressure of the gas within the container 1 forces the material up through the discharge tube 10 and out through the discharge passageway 8a.

As shown in Figs. 2, 4 and 5, the discharge passageway 8a is provided with an enlarged portion near its outlet and forming a valve chamber to receive valve head 17 provided with a valve face 17a of rubber or other similar suitable material adapted to engage valve seat 18. In Fig. 2 the valve is closed, engaging the valve seat, and in Fig. 5 it is open, out of engagement with the valve seat. A valve stem 19 extends from the valve head 17 through the discharge passageway to the outer end thereof. Extending longitudinally through the valve stem is a passageway 19a which branches off at right angles through the valve head 17 to the exterior thereof. There is a space between the sides of the valve head and the sides of the valve chamber for the passage of material from the valve chamber to the passageway 19a when the valve is open.

A slidable bearing 20 in the enlarged portion of the passageway 8a engages the back of the valve head. A coil compression spring 25 surrounding the valve stem 19 engages the slidable bearing 20 and a plug 21 which is screwed into the outer end of the passageway 8a, and normally presses the valve head to cause the valve face 17a to engage valve seat 18 and close the valve.

A valve cap 22 is screwed to the end of the valve stem 19 and is provided with flanges 22a which enclose the end of the passageway. Valve cap 22 is so formed as to provide an atomizing nozzle.

To open the valve there is provided a pair of push rods 23, 23 which slide in apertures through the head 8 and engage the rear edge of flanges 22a. When rods 23, 23 are moved forward they will push the head outwardly thus pulling out the valve stem 19 and opening the valve to cause the material to be dispersed. The other ends of the push rods 23, 23 are engageable by a manually operable trigger 24 pivoted to the underside of a pistol grip or handle 26.

When the lower end of trigger 24 is pulled by a finger it pivots so that its upper end engages push rods 23, 23 to move them forward to engage valve cap 22. When the trigger is released spring 25 retracts valve cap 22 which retracts push rods 23, 23.

It will be observed that when the valve is closed the casing will be sealed by valve head 17, gaskets 9, and diaphragm 17 so that no gas or material can escape, and the contents of the sprayer will remain ready for use repeatedly until the contents are exhausted.

The quantities of material to be placed in the container, and the amount and pressure of the propellant gas used can readily be determined by experience depending on the atomization, particle size and spray pattern desired.

The material container and propellant gas cylinder can be made very cheaply and can be disposed of after use. However, where economical the propellant gas cylinder may be removed from the material container after use and filled again for reuse.

It is thought that the construction and use of the invention will be apparent from the above description of the various parts and their purpose. It is to be understood that the form of our invention herewith shown and described, is to be

What we claim as our invention is:

1. In a pressure dispensing device, the combination of an outer pressure-resistant casing provided with a discharge passage extending therethrough, a non-pressure-resistant material container mounted within the casing, a propellant gas cylinder mounted in the material container and having a portion of the exterior thereof located outside the material container, said propellant gas cylinder being charged with gas at a pressure which would if contained within the material container normally rupture same but which can be contained by the casing, and the outside portion of the cylinder being provided with a puncturable area, means for puncturing the puncturable area of the cylinder and for puncturing the material container to permit gas under pressure to enter the casing and the interior of the material container, and means connecting between the interior of the material container and the discharge passage in the casing for dispensing the material in the container.

2. In a pressure dispensing device, the combination of an outer casing having a removable cover provided with a discharge passage extending therethrough, an inner puncturable material container, a propellant gas cylinder mounted in the material container and having a portion of the exterior thereof located outside the material container, the outside portion being provided with a puncturable area, a discharge tube communicating with the discharge passage in the casing cover and depending therefrom, its lower end being provided with piercing means adapted to puncture the inner container, piercing means mounted on the cover and adapted to puncture the puncturable area of the cylinder, and means for controlling the flow of material through the liquid discharge tube and passage.

3. In a pressure dispensing device, the combination of an outer pressure-resistant casing provided with a discharge passage extending therethrough, a non-pressure-resistant material container mounted within the casing, said container having a threaded opening therein, a propellant gas cylinder provided with a puncturable area and threaded means co-operating with the threaded opening in the container to support the cylinder in the container with the puncturable area outside the container, said propellant gas cylinder being charged with gas at a pressure which would if contained within the material container normally rupture same but which can be contained by the casing, means for puncturing the puncturable area of the cylinder and for puncturing the material container to permit gas under pressure to enter the casing and the interior of the material container, and means connecting between the interior of the material container and the discharge passage in the casing for dispensing the material in the container.

4. In a pressure dispensing device, the combination of an outer casing having a removable cover provided with a discharge passage extending therethrough, an inner puncturable material container, a propellant gas cylinder mounted in the material container and having a portion of the exterior thereof located outside the material container, the outside portion being provided with a puncturable area, a discharge tube communicating with the discharge passage in the casing cover and depending therefrom, its lower end being provided with piercing means adapted to puncture the inner container, piercing means mounted on the cover and adapted to puncture the puncturable area of the cylinder, said means including a member having a piercing point, pressure applying means outside the cover for applying pressure on the piercing point member for forcing the piercing point against the puncturable area of the cylinder, and a gas-tight diaphragm between the pressure applying means and the piercing point member, and means for controlling the flow of material through the liquid discharge tube and passage.

5. In a pressure dispensing device, the combination of an outer casing having a removable cover provided with a discharge passage extending therethrough, an inner puncturable material container, a propellant gas cylinder mounted in the material container and having a portion of the exterior thereof located outside the material container, the outside portion being provided with a puncturable area, a discharge tube communicating with the discharge passage in the casing cover and depending therefrom, its lower end being provided with piercing means adapted to puncture the inner container, piercing means mounted on the cover and adapted to puncture the puncturable area of the cylinder, a valve in the discharge passage, and manually actuated means for opening and closing the valve to control the flow of material through said passage.

6. In a pressure dispensing device, the combination of a casing provided with a discharge passage extending therethrough from the interior to the exterior thereof, gas pressure means for discharging material from the interior of the casing through the discharge passage to the exterior of the casing, said discharge passage being provided with an enlarged portion forming a valve chamber and a valve seat at the inner end thereof, a valve movable in the valve chamber to engage and disengage the valve seat to close and open the passage, a valve stem extending from the low pressure side of the valve through the discharge passage, said valve stem having a hole extending longitudinally thereof and opening at its inner end into the valve chamber and at its outer end into atmosphere, a valve cap secured to the outer end of the valve stem exteriorly of the casing, said valve cap having a central orifice registering with the outer end of the longitudinal hole through which material from the interior of the casing may be ejected, and a shoulder extending beyond the sides of the valve stem, spring means normally urging the valve stem inwardly to cause the valve to engage the seat, and manually actuated means operable to engage the shoulder of the valve cap to move the valve stem outwardly to cause the valve to disengage the seat and open the discharge passage.

7. In a pressure dispensing device, the combination of a casing provided with a discharge passage extending therethrough from the interior to the exterior thereof, gas pressure means for discharging material from the interior of the casing through the discharge passage to the exterior of the casing, said discharge passage being provided with an enlarged portion forming a valve chamber and a valve seat at the inner end thereof, a valve movable in the valve chamber to engage and disengage the valve seat to close and open the passage, a valve stem extending from the low pressure side of the valve through the discharge passage, said valve stem having a hole extending longitudinally thereof and opening at its inner end into the valve chamber and at its outer end into atmosphere, a valve cap secured to the outer end of the valve stem exteriorly of the casing, said valve cap having a central orifice registering with the outer end of the longitudinal hole through which material from the interior of the casing may be ejected, and a shoulder extending beyond the sides of the valve stem, spring means normally urging the valve stem inwardly to cause the valve to engage the seat, and manually actuated means operable to engage the shoulder of the valve cap to move the valve stem outwardly to cause the valve to disengage the seat and open the discharge passage, said manually actuated means including a rod slidably mounted on the casing and engageable with the shoulder of the valve cap.

8. In a pressure dispensing device, the combination of a casing provided with a discharge passage extending therethrough from the interior to the exterior thereof, gas pressure means for discharging material from the interior of the casing through the discharge passage to the exterior of the casing, said discharge passage being provided with an enlarged portion forming a valve chamber and a valve seat at the inner end thereof, a valve movable in the valve chamber to engage and disengage the valve seat to close and open the passage, a valve stem extending from the low pressure side of the valve through the discharge passage, said valve stem having a hole extending longitudinally thereof and opening at its inner end into the valve chamber and at its outer end into atmosphere, a valve cap secured to the outer end of the valve stem exteriorly of the casing, said valve cap having a central orifice registering with the outer end of the longitudinal hole through which material from the interior of the casing may be ejected, and a shoulder extending beyond the sides of the valve stem, spring means normally urging the valve stem inwardly to cause the valve to engage the seat, and manually actuated means operable to engage the shoulder of the valve cap to move the valve stem outwardly to cause the valve to disengage the seat and open the discharge passage, said manually actuated means including a rod slidably mounted on the casing and engageable with the shoulder of the valve cap, and a trigger for sliding the rod.

GEOFFREY H. WOOD.
LAWRENCE THOMAS WARD.

REFERENCES CITED

The following references are of record in the file of this patent:

UNITED STATES PATENTS

| Number | Name | Date |
|---|---|---|
| 599,389 | Jackson | Feb. 22, 1898 |
| 1,725,234 | Wedeberg | Aug. 20, 1929 |
| 1,767,680 | Hutt | June 24, 1930 |
| 2,249,608 | Green | July 15, 1941 |

FOREIGN PATENTS

| Number | Country | Date |
|---|---|---|
| 485,258 | Great Britain | May 17, 1938 |